(12) United States Patent
Lombardi et al.

(10) Patent No.: US 12,379,752 B2
(45) Date of Patent: Aug. 5, 2025

(54) INTEGRATION OF A HINGE ON A FOLDABLE DEVICE

(71) Applicant: Google LLC, Mountain View, CA (US)

(72) Inventors: Michael J. Lombardi, South Barrington, IL (US); Joseph Allore, Mundelein, IL (US); Sangsoo Park, San Jose, CA (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 18/546,517

(22) PCT Filed: Oct. 1, 2021

(86) PCT No.: PCT/US2021/053189
§ 371 (c)(1),
(2) Date: Aug. 15, 2023

(87) PCT Pub. No.: WO2022/177607
PCT Pub. Date: Aug. 25, 2022

(65) Prior Publication Data
US 2024/0302872 A1    Sep. 12, 2024

Related U.S. Application Data

(60) Provisional application No. 63/200,193, filed on Feb. 19, 2021.

(51) Int. Cl.
*G06F 1/16* (2006.01)
*H01Q 1/22* (2006.01)

(52) U.S. Cl.
CPC .......... *G06F 1/1683* (2013.01); *G06F 1/1626* (2013.01); *G06F 1/1698* (2013.01); *H01Q 1/2266* (2013.01)

(58) Field of Classification Search
CPC .... G06F 1/1652; G06F 1/1656; G06F 1/1681; G06F 1/1683; G06F 1/1698
See application file for complete search history.

(56) References Cited

U.S. PATENT DOCUMENTS 5,987,704 A * 11/1999 Tang ............... G06F 1/1681
16/342
6,577,496 B1 * 6/2003 Gioscia ............ H04M 1/0216
455/344

(Continued)

FOREIGN PATENT DOCUMENTS

| CN | 203606232 U | 5/2014 |
| EP | 3439103 A1 | 2/2019 |
| KR | 102171118 B1 | 10/2020 |

OTHER PUBLICATIONS

International Search Report and Written Opinion of International Application No. PCT/US2021/053189, dated Feb. 4, 2022, 20 pp.

(Continued)

*Primary Examiner* — Adrian S Wilson
(74) *Attorney, Agent, or Firm* — Shumaker & Sieffert, P.A.

(57) ABSTRACT

An example folding device (100) includes a hinge assembly (106), a first assembly (102), and a second assembly (104). The hinge assembly (106) defines a first axis (108) and a second axis (110). The first assembly (102) includes a first arm (112), formed from a first material and rotatably connected to the hinge assembly about the first axis, a first main housing component (114), and a first divider (116) disposed between the first arm (112) and the first main housing component (114). The first main housing component (114) is formed from a second material that is different than the first material. The second assembly (104) includes a second arm (118), formed from the first material and rotatably connected to the hinge assembly about the second axis, a second main (Continued)

housing component (120), and a second divider (122) disposed between the second arm (118) and the second main housing component (120). The second main housing component (120) is formed from a second material that is different than the first material. Folding device (100) may include housing components formed from different materials with different properties (e.g. strength, weight, thermal conductivity, galvanic isolation, etc.) to address one or more of the disadvantages (e.g. thickness, weight, thermal performance, wireless transmission performance, reliability, complexity, cost, etc.) while achieving a continuous color appearance.

17 Claims, 7 Drawing Sheets

(56) References Cited

U.S. PATENT DOCUMENTS

| | | | | |
|---|---|---|---|---|
| 8,379,378 | B2* | 2/2013 | Visser | H04M 1/0216 |
| | | | | 16/385 |
| 10,568,221 | B2* | 2/2020 | Li | H04M 1/0283 |
| 10,602,632 | B2* | 3/2020 | Wei | H05K 5/0247 |
| 12,242,310 | B2* | 3/2025 | Lombardi | G06F 1/1681 |
| 2004/0212956 | A1* | 10/2004 | Kuivas | E05D 3/122 |
| | | | | 361/679.06 |
| 2006/0061512 | A1* | 3/2006 | Asano | H01Q 9/42 |
| | | | | 343/702 |
| 2006/0146488 | A1* | 7/2006 | Kimmel | G06F 1/1652 |
| | | | | 361/679.04 |
| 2012/0137024 | A1 | 5/2012 | Kim et al. | |
| 2012/0307472 | A1* | 12/2012 | Bohn | G06F 1/1652 |
| | | | | 361/807 |
| 2013/0192140 | A1 | 8/2013 | Sayama | |
| 2015/0050968 | A1* | 2/2015 | Jeon | C25D 11/04 |
| | | | | 455/575.1 |
| 2015/0241921 | A1* | 8/2015 | Gu | G06F 1/1626 |
| | | | | 428/35.8 |
| 2015/0338887 | A1 | 11/2015 | Farahani et al. | |
| 2015/0378397 | A1 | 12/2015 | Park et al. | |
| 2016/0116948 | A1* | 4/2016 | Ou | G06F 1/1626 |
| | | | | 29/458 |
| 2016/0118712 | A1* | 4/2016 | Gu | H05K 5/04 |
| | | | | 343/702 |
| 2016/0120046 | A1* | 4/2016 | Ou | H05K 5/0086 |
| | | | | 343/702 |
| 2016/0181688 | A1* | 6/2016 | Gu | H01Q 1/242 |
| | | | | 343/702 |
| 2016/0185067 | A1* | 6/2016 | Chen | H01Q 1/243 |
| | | | | 343/702 |
| 2017/0142241 | A1* | 5/2017 | Kim | H01Q 1/243 |
| 2017/0346164 | A1* | 11/2017 | Kim | H04M 1/0266 |
| 2018/0287241 | A1* | 10/2018 | Kumar | G06F 1/1698 |
| 2020/0051468 | A1* | 2/2020 | Jung | G06F 1/1616 |
| 2020/0117245 | A1 | 4/2020 | Ou et al. | |
| 2020/0166974 | A1* | 5/2020 | Ai | H04M 1/0216 |
| 2020/0218311 | A1 | 7/2020 | Park | |
| 2020/0267861 | A1 | 8/2020 | Kim | |
| 2023/0115172 | A1* | 4/2023 | Lombardi | H10K 59/00 |
| | | | | 361/679.27 |
| 2024/0107864 | A1* | 3/2024 | Lombardi | G06F 1/1618 |
| 2024/0211003 | A1* | 6/2024 | Lombardi | H04M 1/0268 |

OTHER PUBLICATIONS

Response to Communication Pursuant to Rules 161(1) and 162 EPC dated Aug. 9, 2023, from counterpart European Application No. 21802062.6, filed Feb. 12, 2024, 19 pp.

Office Action, and translation thereof, from counterpart Korean Application No. 10-2023-7027948 dated Dec. 18, 2024, 16 pp.

Response to Office Action, and translation thereof, dated Dec. 18, 2024, from counterpart Korean Application No. 10-2023-7027948 filed Feb. 18, 2025, 51 pp.

* cited by examiner

INTEGRATION OF A HINGE ON A FOLDABLE DEVICE

BACKGROUND

Devices that include displays may be referred to as display devices. In general, it may be desirable to increase a size of a display (e.g., the area on which images are displayed) as much as possible. However, increasing the size of a display may make the device that includes the display large and unwieldy. For instance, devices with larger displays may not fit in pockets, bags, and the like. One way to increase the size of a display without unduly increasing the size of the device is to make the device collapsible such that the display can be folded (e.g., in half).

SUMMARY

In general, aspects of this disclosure are directed to folding devices that include foldable continuous displays. A folding device may include at least two assemblies (e.g., panels) and a mechanism configured to allow the assemblies to be moved into a collapsed state in which the device is considered closed and an expanded state in which the device is considered open. When the device is in the expanded state, a display may be visible and may cover at least a portion of an inner surface of all of the assemblies. As such, the device may be considered to be a continuous display (i.e., because it continues across a boundary between the assemblies). By utilizing such a folding device, the device may include a display with a relatively large length and/or width (e.g., display area) without overly increasing a length and/or width of the device when in the collapsed state. In this way, the "pocketability" of large-screen portable devices may be improved.

However, some folding mechanisms may introduce one or more disadvantages. As one example, while the length and/or width of the device may be reduced (e.g., relative to a non-folding device with equivalent screen size), incorporation of some folding mechanisms may undesirably increase a thickness and/or weight of the device. As another example, some folding mechanisms may undesirably reduce the reliability of the device. As another example, some folding mechanisms may undesirably reduce a thermal performance of the device (e.g., reduce an amount of heat dissipated). As another example, the folding mechanism may be complex and difficult to manufacture, which may undesirably increase a cost of the device.

In accordance with one or more aspects of this disclosure, a folding device may include components such as assembly arms, main housing components, and/or the like formed from different materials with different properties (e.g., durability, weight, thermal conductivity, etc.) By including components formed from different materials, the folding device may overcome one or more of the issues described above.

In one example, a folding device includes a hinge assembly defining a first axis and a second axis, a first assembly, and a second assembly. The first assembly includes a first arm, a first main housing component, and a first divider. The first arm is rotatably connected to the hinge assembly about the first axis and is formed from a first material. The first main housing component is formed from a second material that is different than the first material. The first divider is disposed between the first arm and the first main housing component. The second assembly includes a second arm, a second main housing component, and a second divider. The second arm is rotatably connected to the hinge assembly about the second axis and is formed from a first material. The second main housing component is formed from the second material. The second divider is disposed between the second arm and the second main housing component.

The details of one or more examples are set forth in the accompanying drawings and the description below. Other features, objects, and advantages of the disclosure will be apparent from the description and drawings, and from the claims.

DETAILED DESCRIPTION

Figure 1:
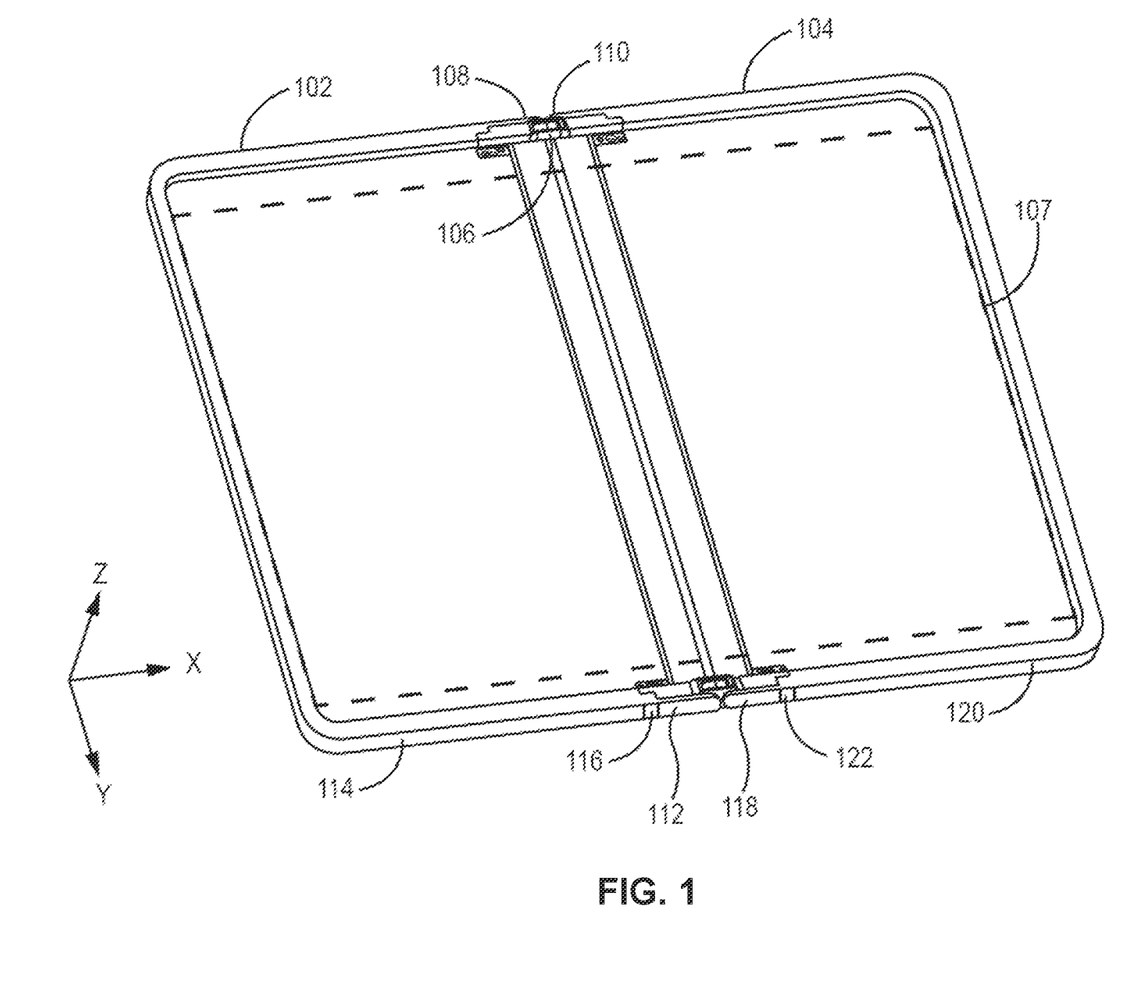
FIG. 1 is a schematic diagram illustrating a folding device with a hinge assembly integrated into the first and second assemblies of the folding device, in accordance with one or more aspects of this disclosure.

FIG. 1 is a schematic diagram illustrating a folding device with a hinge assembly integrated into the first and second assemblies of the folding device, in accordance with one or more aspects of this disclosure. Examples of folding device 100 include foldable mobile computing devices such as foldable smart phones, foldable tablets, foldable e-readers, foldable gaming systems, and any other foldable portable device that includes a display.

As shown in FIG. 1, folding device 100 includes a first assembly 102, a second assembly 104, a hinge assembly 106, and a continuous display 107 (illustrated as being a transparent perimeter). Each of first assembly 102 and second assembly 104 may include an inner surface and an outer surface. The outer surface of first assembly 102 and the outer surface of second assembly 104 may be visible when looking up at folding device 100 in the z-axis, and the inner surface of first assembly 102 and the inner surface of second assembly 104 may be visible when looking down at folding device 100 in the z-axis. The inner surfaces of first assembly 102 and second assembly 104 may not be externally visible when folding device 100 is closed.

Hinge assembly 106 may be configured to enable first assembly 102 and second assembly 104 to move relative to hinge assembly 106. For example, hinge assembly 106 may define a first axis 108 and a second axis 110. First assembly 102 and second assembly 104 may be configured to rotate about first axis 108 and second axis 110, respectively, to allow first assembly 102 and second assembly 104 to move into a collapsed state and an expanded state.

Continuous display 107 may be capable of rendering data into images viewable by a user of folding device 100. For example, continuous display 107 may include a matrix of pixels that are individually controllable. Examples of continuous display 107 include, but are not limited to, liquid crystal displays (LCD), light emitting diode (LED) displays, organic light-emitting diode (OLED) displays, micro light-emitting diode (microLED) displays, or similar monochrome or color displays capable of outputting visible information to a user of folding device 100. In some examples, folding device 100 may include one or more displays in addition to continuous display 107. For instance, folding device 100 may include a first additional display on the outer surface of first assembly 102. In some examples, folding device 100 may further include a second additional display on the outer surface of second assembly 104.

One or more of continuous display 107, the first additional display, and/or the second additional display may be presence-sensitive displays. In some examples, a presence sensitive display may detect an object at and/or near a screen. As one example range, a presence-sensitive display may detect an object, such as a finger or stylus that is within 2 inches or less of the screen. The presence-sensitive display may determine a location (e.g., an (x,y) coordinate) of a screen at which the object was detected. In another example range, a presence-sensitive display may detect an object six inches or less from the screen and other ranges are also possible. The presence-sensitive display may determine the location of the screen selected by a user's finger using capacitive, inductive, and/or optical recognition techniques. In some examples, presence sensitive display also provides output to a user using tactile, audio, or video stimuli.

First assembly 102 may include a first arm 112 and a first main housing component 114. First arm 112 may be rotatably connected to hinge assembly 106 about first axis 108. In some examples, folding device 100 may be fabricated such that first arm 112 is assembled adjacent to first main housing component 114. First main housing component 114 may be configured to enable one or more segments of first main housing component 114 to operate as wireless antennas. For example, folding device 100 may include a transceiver configured to transmit and receive wireless signals via an antenna that includes at least a portion of first main housing component 114.

Similarly, second assembly 104 may include a second arm 118 and a second main housing component 120. Second arm 118 may be rotatably connected to hinge assembly 106 about second axis 110. In some examples, folding device 100 may be fabricated such that second arm 118 is assembled adjacent to second main housing component 120. Second main housing component 120 may be configured to enable one or more segments of second main housing component 120 to operate as wireless antennas. For example, folding device 100 may include a transceiver configured to transmit and receive wireless signals via an antenna that includes at least a portion of second main housing component 120. In some examples, the antenna may include at least a portion of first main housing component 114 and second main housing component 120.

In some examples, first assembly 102 may include additional arms that are similar, if not substantially similar, to first arm 112. For example, first assembly 102 may also include a third arm, rotatably connected to hinge assembly 106 about first axis 108 on an opposite end of first axis 108 than first arm 112. In any case where folding device 100 includes a third arm and a third divider, description relating to first arm 112 may apply equally to the third arm.

Second assembly 104 may likewise include additional arms that are similar, if not substantially similar, to second arm 118. For example, second assembly 104 may further include a fourth arm, rotatably connected to hinge assembly 106 about second axis 110 on an opposite end of second axis 110 than second arm 118. In any case where folding device 100 includes a fourth arm, description relating to second arm 118 may apply equally to the fourth arm.

Some folding mechanisms that enable first assembly 102 and second assembly 104 to be moved may introduce one or more disadvantages. As one example, while the length and/or width of folding device 100 may be reduced (e.g., relative to a non-folding device with equivalent screen size), incorporation of some folding mechanisms may undesirably increase a thickness and/or weight of folding device 100. As another example, some folding mechanisms may undesirably reduce the reliability of folding device 100. As another example, some folding mechanisms may undesirably reduce the thermal performance of folding device 100 (e.g., reduce an amount of heat dissipated). As another example, the folding mechanism may be complex and difficult to manufacture, increasing the cost of folding device 100.

For instance, some folding mechanisms that incorporate housing components (e.g., first arm 112, first main housing component 114, second arm 118, second main housing component 120, etc.) that are all formed from aluminum may be susceptible to reliability failure due to the strength of aluminum. For example, if a user drops folding device 100 on a corner of folding device 100 at which first arm 112 is located, the entire weight of folding device 100 may be loaded onto first arm 112. Where first arm 112 is formed of aluminum, this force may potentially deform first arm 112 and/or components to which first arm 112 is connected (e.g., hinge assembly 106). This deformation itself may be undesirable (e.g., due to changing the appearance of folding device 100) and may also bind hinge assembly 106 such that first assembly 102 and second assembly 104 undesirably resists movement.

On the other hand, folding mechanisms that incorporate housing components that are all formed from steel may not be susceptible to reliability failure due to the strength of steel but may introduce one or more other disadvantages, such as increased weight, reduce thermal performance, and/or the like of folding device 100. Further, such folding mechanisms that incorporate only steel components may prevent segments of first main housing component 114 and second main housing component 120 from operating as wireless antennas.

Some folding mechanisms may incorporate housing components that are formed from different materials. For example, a folding mechanism may include first arm 112 formed from steel to address the susceptibility of first arm 112 to reliability failure and first main housing component 114 formed from aluminum to reduce the weight and improve the thermal performance (e.g., relative to first main housing component 114 formed from steel) of folding device 100. However, color coatings applied to different materials (e.g., steel and aluminum) may have different appearances. Coatings with different appearances may have different color values, where a color value is associated with a color property (e.g., brightness, saturation, etc.). As such, folding mechanisms that incorporate steel and aluminum housing components may fail to achieve "a continuous metal band" appearance desired by some users.

For example, a color coating applied to first arm 112 formed from steel may have a first color value (e.g., a dark shade of grey), and a color coating applied to a main housing component 114 formed from aluminum may have a second color value (e.g., a light shade of grey). The difference between the first color value and the second color value (e.g., different brightness, different saturation, etc.) may be visually apparent to a user of folding device 100 such that when first arm 112 having the color coating with the first color value is adjacent to first main housing component 114 having the color coating with the second color value, the user can readily notice the discrepancy in color. As a result, some folding mechanisms that incorporate different materials may undesirably fail to achieve the continuous metal band appearance.

In accordance with one or more aspects of this disclosure, folding device 100 may include a first divider 116 disposed between first main housing component 114 and first arm 112. First divider 116 may isolate first main housing component 114 from first arm 112 and hinge assembly 106. For example, first divider 116 may be disposed between first arm 112 and first main housing component 114 to physically and/or galvanically separate first arm 112 from first main housing component 114. First divider 116 may be a polymer antenna isolator such that one or more segments of first main housing component 114 may transmit and receive electromagnetic signals (e.g., to enable one or more segments of first main housing component 114 to operate as wireless antennas).

Additionally or alternatively, folding device 100 may include a second divider 122 disposed between second main housing component 120 and second arm 118. Second divider 122 may isolate second main housing component 120 from second arm 118 and hinge assembly 106. For example, second divider 122 may be disposed between second arm 118 and second main housing component 120 to physically and/or galvanically separate second arm 118 and second main housing component 120. Second divider 122 may be a polymer antenna isolator such that one or more segments of second main housing component 122 may transmit and receive electromagnetic signals (e.g., to enable one or more segments of second main housing component 122 to operate as wireless antennas).

In some examples, folding device 100 may include additional dividers that are similar, if not substantially similar, to first divider 116 and second divider 122. For example, first assembly 102 may include a third divider, disposed between a third arm and first main housing component 114, configured to enable one or more segments of first main housing component 114 to operate as an antenna. Additionally or alternatively, second assembly 104 may include a fourth divider, disposed between a fourth arm and second main housing component 120, configured to enable one or more segments of second main housing component 120 to operate as an antenna. In any case where folding device 100 includes a third divider and/or a fourth divider, description relating to first divider 116 and/or second divider 122 may apply equally to the third divider and/or fourth divider, respectively, except for any differences described herein.

First divider 116 and second divider 122 may have a color coating with a third color value that is between the first color value and the second color value. In turn, the first color value of the color coatings of first arm 112 and second arm 118 may appear to transition into the second color value of the color coatings of first main housing component 114 and second main housing component 120 via the intermediate third color value of the color coatings of first divider 116 and second divider 122 such that the difference between the first color value and the second color value is less visually apparent to a user of folding device 100.

In this way, folding device 100 may include housing components formed from different materials with different properties (e.g., strength, weight, thermal conductivity, etc.) to address one or more of the disadvantages described above (e.g., thickness, weight, thermal performance, reliability, complexity, cost, etc.) while achieving a continuous metal band appearance. For example, to address the susceptibility of first arm 112 to reliability failure, first arm 112 may be formed from a first material that is relatively strong. In some examples, the first material may be steel, which may be relatively strong compared to another material, such as aluminum. Second arm 118 may be formed from the first material that is relatively strong (e.g., steel) for the same reasons that apply to first arm 112. In some examples, first arm 112 and second arm may be enhanced with a physical vapor deposition (PVD) that applies a color coating to first arm 112 and second arm 118. The color coating of first arm 112 and second arm 118 may have a first color value (e.g., a dark shade of grey) associated with one or more color properties, such as brightness, saturation, and/or the like. For example, the first color value may be a dark shade of grey, though other shades, colors, and/or the like are contemplated.

To address the weight and thermal performance of folding device 100, first main housing component 114 may be formed from a second material (different from the first material) that is relatively light and thermally conductive. In some examples, the second material may be aluminum, which may be relatively light and thermally conductive compared to another material, such as steel. Second main housing component 120 may be formed from a second material that is relatively light and thermally conductive (e.g., aluminum) for the same reasons that apply to first main housing component 114. In some examples, first main housing component 114 and second main housing component 120 may be anodized to apply a color coating to first main housing component 114 and second main housing component 120. The color coating of first main housing component 114 and second main housing component 120 may have a second color value (e.g., a light shade of grey) associated with one or more color properties, such as brightness, saturation, and/or the like. The second color value may or may not be different from the first color value. For example, the second color value may be a light shade of grey, though other shades, colors, and/or the like are contemplated.

To achieve a continuous metal band appearance, first divider 116 may be disposed between first arm 112 and first main housing component 114 such that there is no gap between first arm 112 and first divider 116 or between first main housing component 114 and first divider 116. In other words, a first end of first divider 116 may be flush against an end of first arm 112, and a second end of first divider 116 may be flush against an end of first main housing component 114. Additionally, a color coating with a third color value (e.g., an intermediate shade of grey) may be applied to first divider 116. The third color value of the color coating of first divider 116 may be between the first color value of the color coating of first arm 112 and the second color value of the color coating of first main housing component 114. In this way, the first color value may appear to transition to the second color value via the intermediate third color value, potentially making the difference between the first color value and the second color value less visually apparent to a user of folding device 100. For example, if first arm 112 has a color coating that is a shade of dark grey and first main housing component 114 a color coating that is a shade of light grey, first divider 116 may have a color coating that is a shade of intermediate grey. In any case, the color properties associated with the third color value may be between the color properties associated with the first color value and the color properties associated with the second color value. The color properties may include brightness, saturation, and/or the like.

Similarly, second divider 122 may be disposed between second arm 118 and second main housing component 120 such that there is no gap between second arm 118 and second divider 122 or between second main housing component 120 and second divider 122. In other words, a first end of second divider 122 may be flush against an end of second arm 118, and a second end of second divider 122 may be flush against an end of second main housing component 120. Additionally, a color coating with a third color value (e.g., an intermediate shade of grey) may be applied to second divider 122. The third color value of the color coating of second divider 122 may be between the first color value of the color coating of second arm 118 and the second color value of the color coating of second main housing component 120 in this way, the first color value may appear to transition to the second color value via the intermediate third color value, potentially making the difference between the first color value and the second color value less visually apparent to a user of folding device 100.

For example, if second arm 118 has a color coating that is a shade of dark grey and second main housing component 120 a color coating that is a shade of light grey, second divider 122 may have a color coating that is a shade of intermediate grey. In any case, the color properties associated with the third color value may be between the color properties associated with the first color value and the color properties associated with the second color value. The color properties may include brightness, saturation, and/or the like.

Thus, in accordance with one or more aspects of this disclosure, folding device 100 may incorporate a folding mechanism that includes different materials to address multiple issues introduced by some folding mechanisms such as thickness, weight, reliability, thermal performance, cost, and/or the like while achieving the continuous metal band appearance desired by some users. For example, first arm 112 and second arm 118 may be formed from steel, potentially making first arm 112 and second arm 118 less susceptible to reliability failure. First main housing component 114 and second main housing component 120 may be formed from aluminum, potentially making first main housing component 114 and second main housing component 120 lightweight and thermally conductive.

Then, to achieve a continuous metal band appearance, first divider 116 may be disposed between first arm 112 and first main housing component 114 such that there is no gap between these components, and second divider 122 may be disposed between second arm 118 and second main housing component 120 such that there is no gap between these components. The color coatings of first divider 116 and second divider 122 may have a third color value between a first color value of the color coatings of first arm 112 and second arm 118 and a second color value of the color coatings of first main housing component 114 and second main housing component 120. As a result, the first color value of the color coatings of first arm 112 and second arm 118 may visually appear to transition into the second color value of the color coatings of first main housing component 114 and second main housing component 120.

Figure 2:
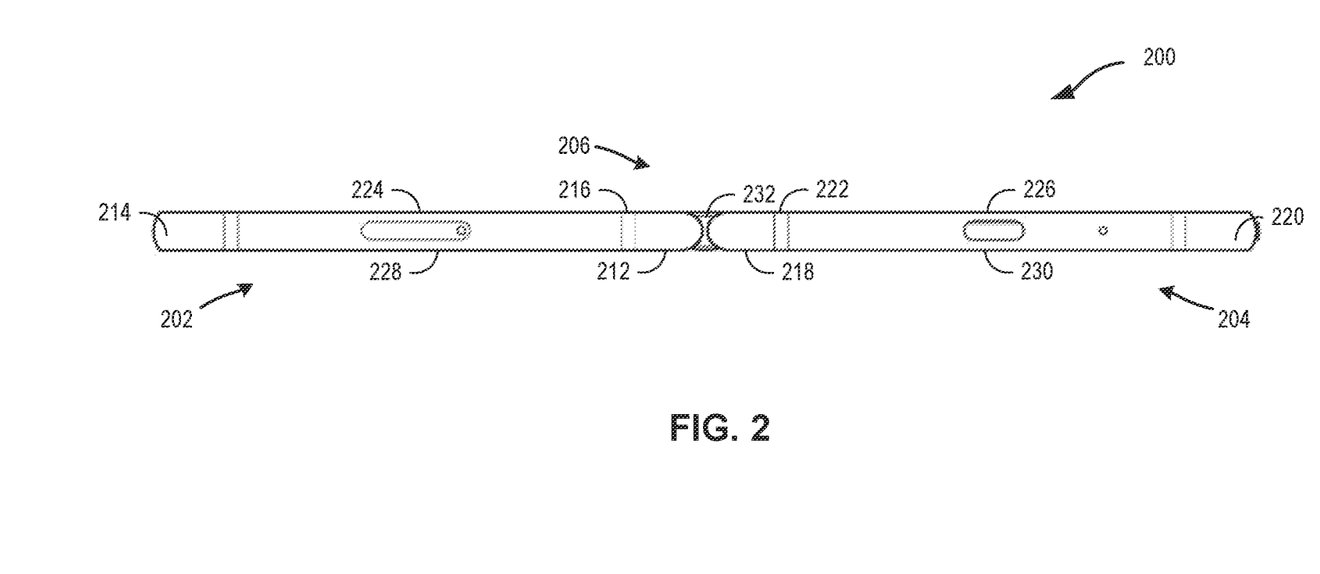
FIG. 2 is a schematic diagram illustrating a folding device in an expanded state, in accordance with one or more aspects of this disclosure.

FIG. 2 is a schematic diagram illustrating a folding device 200 (which is one example of folding device 100 shown in FIG. 1) in an expanded state, in accordance with one or more aspects of this disclosure. As shown in the example of FIG. 2, folding device 200 may include a first assembly 202 (which is one example of first assembly 102 shown in FIG. 1) and a second assembly 204 (which is one example of second assembly 104 shown in FIG. 1). First assembly 202 may include a first arm 212 (which is one example of first arm 112 shown in FIG. 1), a first main housing component 214 (which is one example of first main housing component 114 shown in FIG. 1), and a first divider 216 (which is one example of first divider 116 shown in FIG. 1). Similarly, second assembly 204 may include a second arm 218 (which is one example of first arm 118 shown in FIG. 1), a second main housing component 220 (which is one example of second main housing component 120 shown in FIG. 1), and a second divider 222 (which is one example of first divider 122 shown in FIG. 1).

As shown in the example of FIG. 2, folding device 200 may be moved into an expanded state in which folding device 200 is fully open. Folding device 200 may be configured such that, when folding device 200 is in the expanded state, an inner surface 224 of first assembly 202 may be coplanar with an inner surface 226 of second assembly 204, and an outer surface 228 of first assembly 202 may be coplanar with an outer surface 230 of second assembly.

For example, folding device 200 may incorporate first arm 212 and second arm 218 formed from a relatively strong material, such as steel, allowing for the designs of first arm 212 and second arm 218 to be thinner and straighter while satisfying reliability requirements for the folding mechanism of folding device 200. In turn, the design of hinge assembly 206 (which is one example of hinge assembly 106 shown in FIG. 1) may be simplified, potentially resulting in a less complex industrial design.

As further shown in FIG. 2, folding device 200 may further include a cap 232 configured to cover (and seal) a portion of hinge assembly 206 proximate to first arm 212 and second arm 218. In this way, cap 232 may prevent ingress of dust and other materials that may impair the functioning of hinge assembly 206 into hinge assembly 206 via this portion of hinge assembly 206. In addition, cap 232 may visually obstruct an inside of hinge assembly 206 such that a user of folding device 200 cannot see components within hinge assembly 206.

Figure 3:
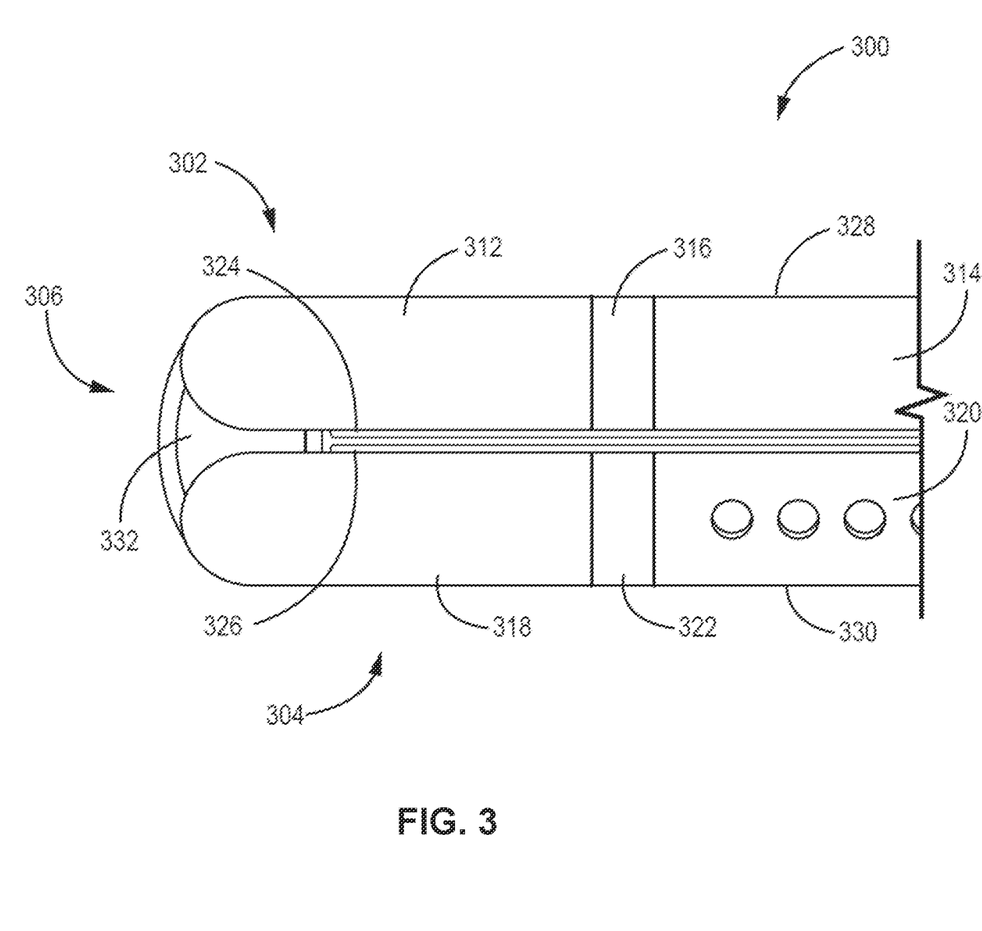
FIG. 3 is a schematic diagram illustrating a folding device in a collapsed state, in accordance with one or more aspects of this disclosure.

FIG. 3 is a schematic diagram illustrating a folding device 300 in a collapsed state, in accordance with one or more aspects of this disclosure. As shown in the example of FIG. 3, folding device 300 may include a first assembly 302 (which is one example of first assembly 102 shown in FIG. 1) and a second assembly 304 (which is one example of second assembly 104 shown in FIG. 1). First assembly 302 may include a first arm 312 (which is one example of first arm 112 shown in FIG. 1), a first main housing component 314 (which is one example of first main housing component 114 shown in FIG. 1), and a first divider 316 (which is one example of first divider 116 shown in FIG. 1). Similarly, second assembly 304 may include a second arm 318 (which is one example of first arm 118 shown in FIG. 1), a second main housing component 320 (which is one example of second main housing component 120 shown in FIG. 1), and a second divider 322 (which is one example of first divider 122 shown in FIG. 1).

As shown in the example of FIG. 3, folding device 300 may be moved into a collapsed state in which folding device 300 is fully closed. Folding device 300 may be configured such that, when folding device 300 is in the collapsed state, an inner surface 324 (which is one example of inner surface 224 shown in FIG. 2) of first assembly 302 may be coplanar with an inner surface 326 (which is one example of inner surface 226 shown in FIG. 2) of second assembly 304, and an outer surface 328 (which is one example of outer surface 228 shown in FIG. 2) of first assembly 302 may be parallel with outer surface 330 (which is one example of outer surface 230 shown in FIG. 2) of second assembly 304.

For example, folding device 300 may incorporate first arm 312 and second arm 318 formed from a relatively strong material, such as steel, allowing for the designs of first arm 312 and second arm 318 to be thinner and straighter while satisfying reliability requirements for the folding mechanism of folding device 300. In turn, the design of a hinge assembly 306 (which is one example of hinge assembly 106 shown in FIG. 1) may be simplified, potentially resulting in a less complex industrial design. In some examples, folding device 300 may include a cap 332 (which is one example of cap 232 shown in FIG. 2) configured to cover (and seal) a portion of hinge assembly 206.

Figure 4:
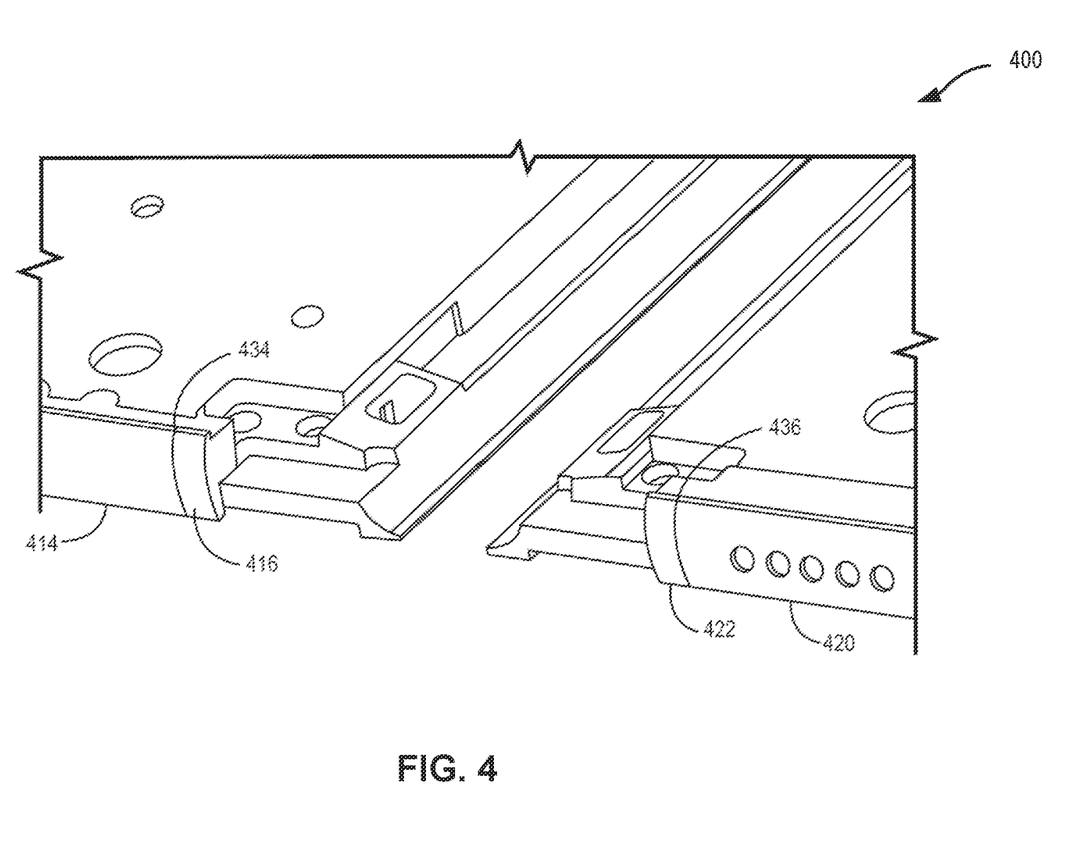
FIG. 4 is a schematic diagram illustrating, in greater detail, main housing components of the folding device, in accordance with one or more aspects of this disclosure.

FIG. 4 is a schematic diagram illustrating, in greater detail, main housing components of a folding device 400 (which is one example of folding device 100 shown in FIG. 1), in accordance with one or more aspects of this disclosure. As shown in FIG. 4, a first main housing component 414 (which is one example of first main housing component 114 shown in FIG. 1) may be fabricated with a first divider 416 (which is one example of first divider 116 shown in FIG. 1) molded into first main housing component 414. First divider 416 may be disposed at an end 434 of first main housing component 414 such that there is no gap between end 434 and first divider 416. As described above, first main housing component 414 may be formed from aluminum (e.g., anodized aluminum) and first divider 416 may be formed from a polymer configured to isolate first main housing component 414 from a first arm (e.g., first arm 112) formed from steel or some other material, thereby enabling and/or improving antenna functionality of first main housing component 414.

Similarly, a second divider 422 (which is one example of second divider 122 shown in FIG. 1) may be disposed at an end 436 of second main housing component 120 (which is one example of second main housing component 120 shown in FIG. 1) such that there is no gap between end 436 and second divider 422. Like first main housing component 414, second main housing component 420 may be formed from aluminum and second divider 422 may be formed from a polymer configured to isolate second main housing component 420 from a second arm (e.g., second arm 118) formed from steel or some other material, thereby enabling and/or improving antenna functionality of second main housing component 120.

Both first divider 416 and second divider 422 may be fabricated to match the overall geometry and appearance of first main housing component 414 and second main housing component 420. First divider 416 and second divider 422 may be mechanically coupled with first main housing component 414 and second main housing component 420, respectively, via an interference fit, fasteners, adhesives, and/or the like.

Figure 5:
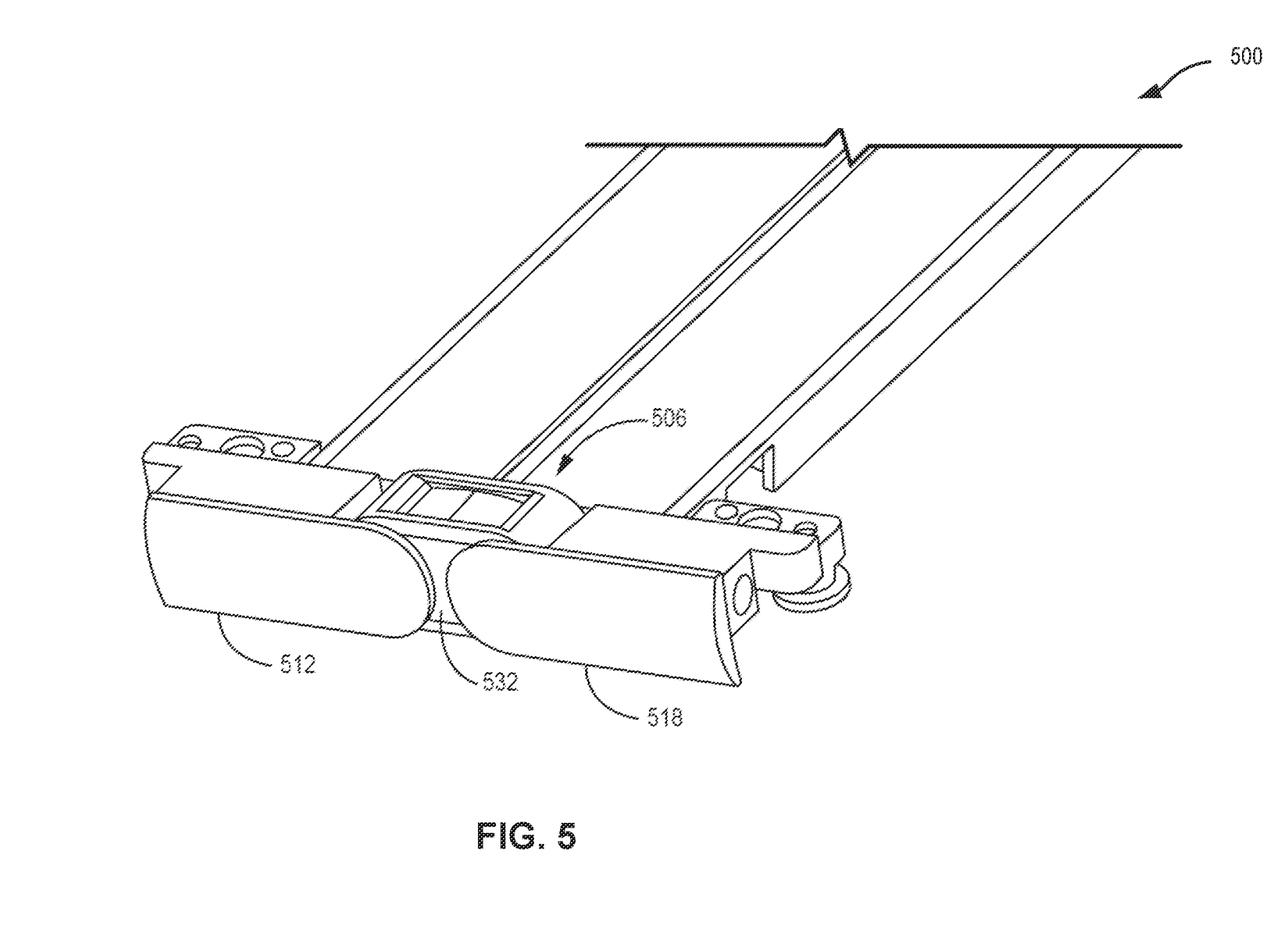
FIG. 5 is a schematic diagram illustrating, in greater detail, a hinge assembly rotatably coupled to arms of the first assembly and the second assembly, in accordance with one or more aspects of this disclosure.

FIG. 5 is a schematic diagram illustrating, in greater detail, a hinge assembly 506 (which is one example of hinge assembly 106 shown in FIG. 1) of a folding device 500 (which is one example of folding device 100 shown in FIG. 1) rotatably coupled to a first arm 512 (which is one example of first arm 112 shown in FIG. 1) of a first assembly (e.g., first assembly 102) and a second arm 518 (which is one example of second arm 118 shown in FIG. 1) of a second assembly (e.g., second assembly 104), in accordance with one or more aspects of this disclosure. As shown in FIG. 5, a portion of hinger assembly 506 may be covered by a cap 532 (which is one example of cap 232 shown in FIG. 2). First arm 512 may be configured to rotate about a first axis (e.g., first axis 108) of hinge assembly 506. Similarly, second arm 518 may be configured to rotate about a second axis (e.g., second axis 110) of hinge assembly 506.

Figure 6:
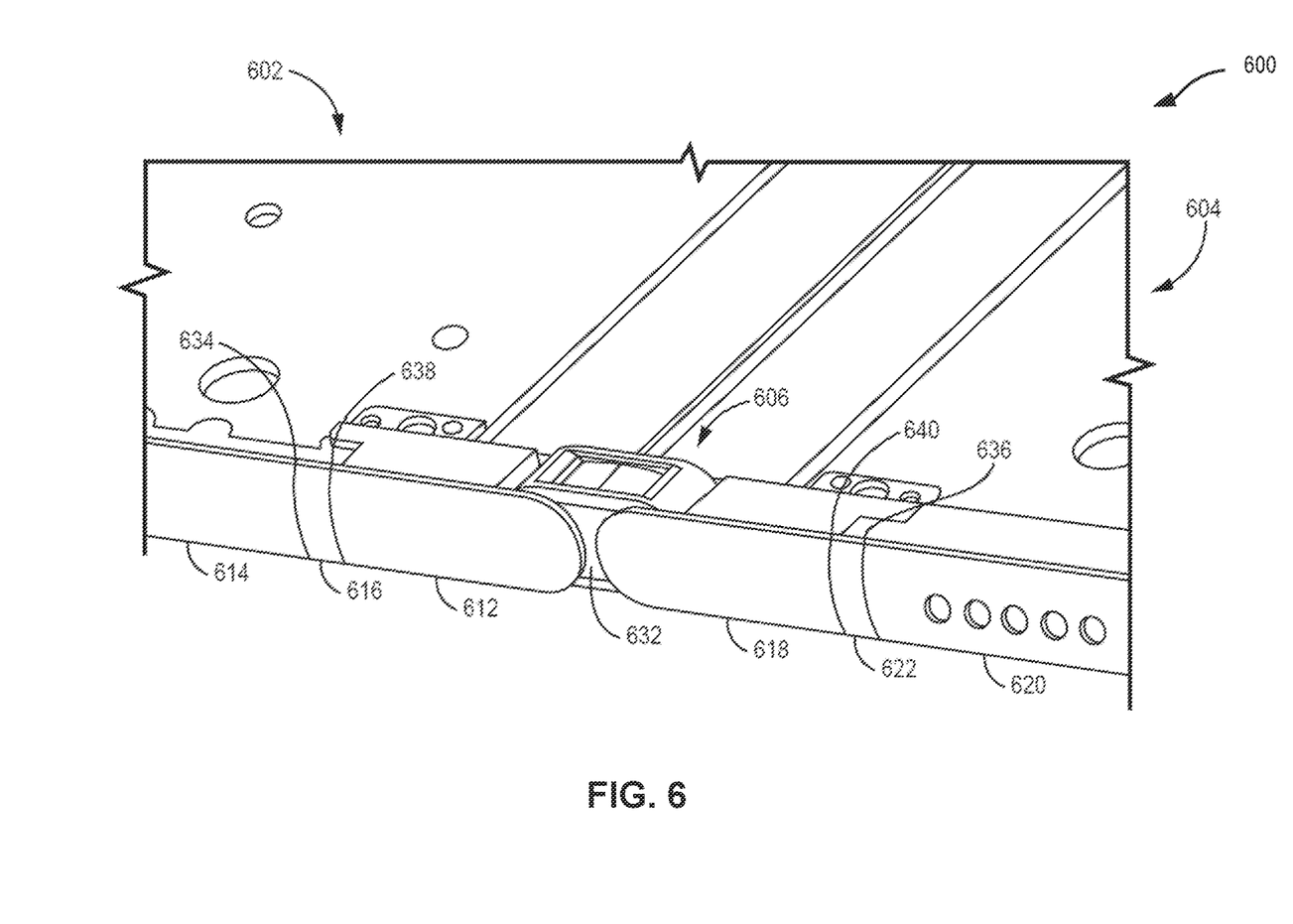
FIG. 6 is a schematic diagram illustrating a hinge assembly assembled with the main housing components of the folding device, in accordance with one or more aspects of this disclosure.

FIG. 6 is a schematic diagram illustrating a hinge assembly 606 (which is one example of hinge assembly 106 shown in FIG. 1) assembled with a first assembly 602 (which is one example of first assembly 102 shown in FIG. 1) and a second assembly 604 (which is one example of second assembly 104 shown in FIG. 1) of a folding device 600 (which is one example of folding device 100 shown in FIG. 1), in accordance with one or more aspects of this disclosure. As shown in FIG. 6, a first arm 612 (which is one example of first arm 112 shown in FIG. 1) and a second arm 618 (which is one example of second arm 118 shown in FIG. 1) may be assembled to hinge assembly 606, a first main housing component 614 (which is one example of first main housing component 114 shown in FIG. 1), and a second main housing component 620 (which is one example of second main housing component 120 shown in FIG. 1). In some examples, hinge assembly 606 may be fastened to first main housing component 614 and second main housing component 620 using fasteners, such as screws.

As shown in FIG. 6, a first divider 116 (which is one example of first divider 116 shown in FIG. 1) may be disposed between first arm 612 and first main housing component 614 such that there is neither a gap between first main housing component 614 and an end 634 (which is one example of end 434 shown in FIG. 4) of first divider 616 nor a gap between first arm 612 and an end 638 of first divider 616. As further shown in FIG. 6, a second divider 622 (which is one example of second divider 122 shown in FIG. 1) may be disposed between second arm 618 and second main housing component 620 such that there is neither a gap between second main housing component 620 and an end 636 (which is one example of end 436 shown in FIG. 4) of second divider 622 nor a gap between second arm 618 and an end 640 of second divider 622.

To simultaneously address various issues that may be introduced by some folding mechanisms, first arm 612 and second arm 618 may be formed from a first material, and first main housing component 614 and second main housing component 620 may be formed from a second material different from the first material. For example, first arm 612 and second arm 618 may be formed from steel (enhanced with PVD) to ensure that first arm 612 and second arm 618 satisfy reliability requirements of folding device 600. Additionally, first main housing component 614 and second main housing component 620 may be formed from (anodized) aluminum to reduce a thickness, weight, and/or thermal performance of folding device 600.

Because first arm 612 and second arm 618 may have a color coating with a first color value and first main housing component 614 and second main housing component 620 may have a color coating with a second color value, first divider 616 and second divider 622 may have a color coating with a third color value that is between the first color value in the second color value. For example, due to first divider 616 being disposed between first arm 612 and first main housing component 614, the first color value of the color coating of first arm 612 may appear to transition into the second color value of the color coating of first main housing component 614 through the intermediate third color value of the color coating of first divider 616.

Likewise, due to second divider 622 being disposed between second arm 618 and second main housing component 620, the first color value of the color coating of second arm 618 may appear to transition into the second color value of the color coating of second main housing component 620 through the intermediate third color value of the color coating of second divider 622. In this way, the difference between the first color value and the second color value may not be visually apparent to a user of folding device 600, thus helping folding device 600 achieve a continuous metal band appearance.

Figure 7:
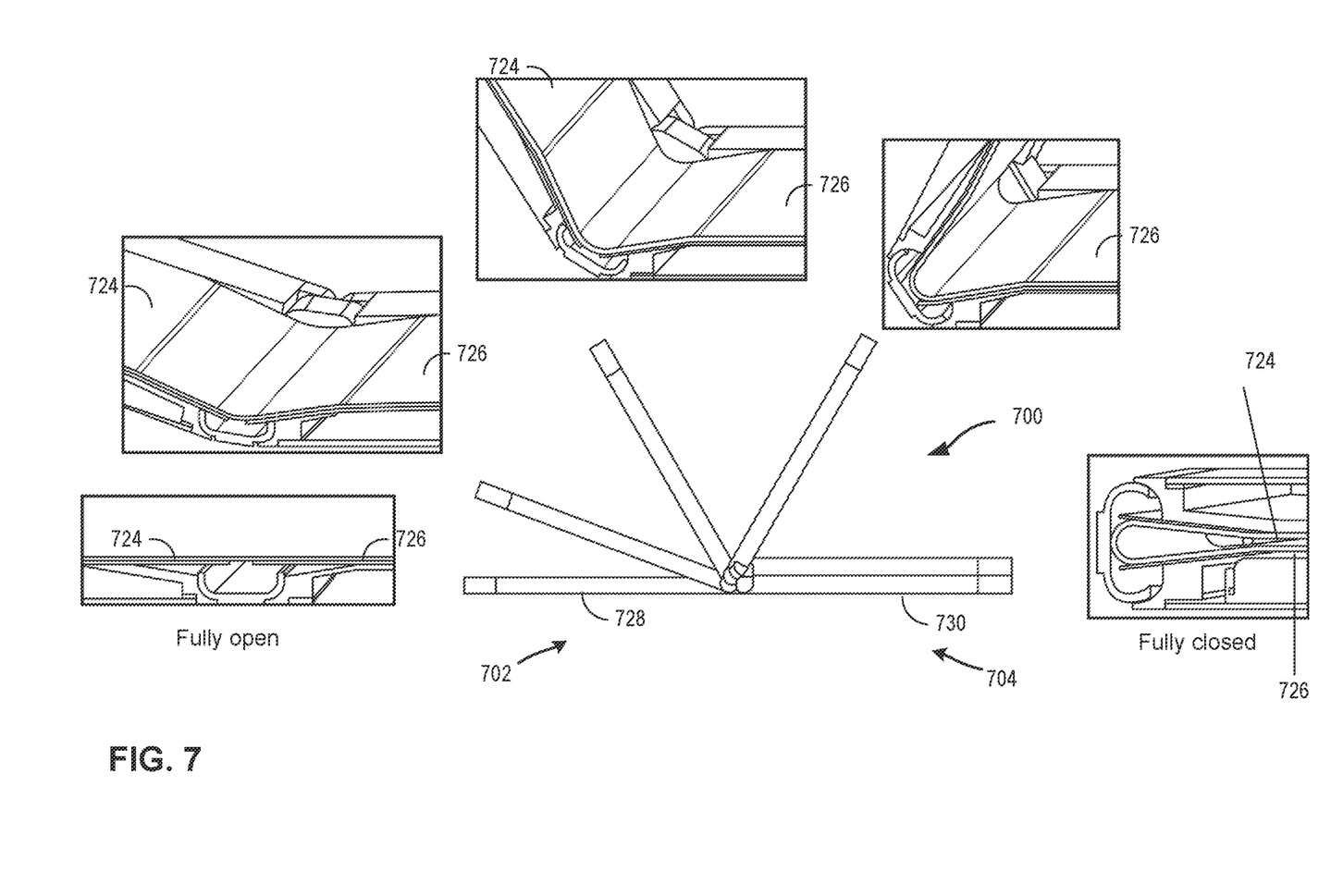
FIG. 7 is a schematic diagram illustrating a folding device with a flexible display in a plurality of folded states, in accordance with one or more aspects of this disclosure.

FIG. 7 is a schematic diagram illustrating a folding device 700 (which is one example of folding device 100 shown in FIG. 1) with a flexible display in a plurality of folded states, in accordance with one or more aspects of this disclosure. As can be seen in FIG. 7, an inner surface 724 (which is one example of inner surface 224 shown in FIG. 2) of a first assembly 702 (which is one example of first assembly 102 shown in FIG. 1) may be coplanar with inner surface 726 (which is one example of inner surface 226 shown in FIG. 2) of a second assembly 704 (which is one example of second assembly 104 shown in FIG. 1), and an outer surface 728 (which is one example of outer surface 228 shown in FIG. 2) of first assembly 702 may be parallel with outer surface 730 (which is one example of outer surface 230 shown in FIG. 2) of second assembly 704 while folding device 700 is closed. As also shown in FIG. 7, when folding device 700 is fully open, an inner surface 724 of first assembly 702 may be coplanar with inner surface 726 of second assembly 704, and an outer surface 728 of first assembly 702 may be coplanar with an outer surface 730 of second assembly 704.

In this way, various aspects of the techniques may enable the following clauses.

Clause 1: A folding device includes a hinge assembly defining a first axis and a second axis; a first assembly includes a first arm, rotatably connected to the hinge assembly about the first axis, the first arm formed from a first material; a first main housing component formed from a second material that is different than the first material; and a first divider disposed between the first arm and the first main housing component; and a second assembly includes a second arm, rotatably connected to the hinge assembly about the second axis, the second arm formed from the first material; a second main housing component formed from the second material; and a second divider disposed between the second arm and the second main housing component.

Clause 2: The folding device of clause 1, wherein the first assembly further includes: a third arm, rotatably connected to the hinge assembly about the first axis, the third arm formed from the first material; and a third divider disposed between the third arm and the first main housing component.

Clause 3: The folding device of clause 1 or 2, wherein the second assembly further includes: a fourth arm, rotatably connected to the hinge assembly about the second axis, the fourth arm formed from the first material; and a fourth divider disposed between the fourth arm and the second main housing component.

Clause 4: The folding device of any of clauses 1-3, wherein the first assembly and the second assembly are configured to rotate about the first axis and the second axis, respectively, to move the folding device into one of an expanded state or a collapsed state.

Clause 5: The folding device of clause 4, wherein when the folding device is in the expanded state: an inner surface of the first assembly is coplanar with an inner surface of the second assembly; and an outer surface of the first assembly is coplanar with an outer surface of the second assembly.

Clause 6: The folding device of clause 4 or 5, wherein when the folding device is in the collapsed state, an outer surface of the first assembly is parallel with an outer surface of the second assembly.

Clause 7: The folding device of any of clauses 1-6, wherein the first divider and the second divider each include a polymer antenna isolator.

Clause 8: The folding device of any of clauses 1-7, wherein the first arm and the second arm are enhanced with a physical vapor deposition.

Clause 9: The folding device of clause 1-8, wherein the first main housing component and the second main housing component are anodized.

Clause 10: The folding device of any of claims 1-9, wherein: an appearance of an outer surface of the first arm is a first color value; an appearance of an outer surface of the first main housing component is a second color; an appearance of an outer surface of the first divider is a third color value; and the third color value is between the first color value and the second color value.

Clause 11: The folding device of any claims 1-10, wherein: an appearance of an outer surface of the second arm is a first color value; an appearance of an outer surface of the second main housing component is a second color; an appearance of an outer surface of the second divider is a third color value; and the third color value is between the first color value and the second color value.

Clause 12: The folding device of any of clauses 1-11, wherein the first main housing component and the second main housing component are configured to send and receive electromagnetic signals.

Clause 13: The folding device of any of clauses 1-12, wherein the hinge assembly further includes a cap configured to cover a portion of the hinge assembly proximate to the first arm and the second arm to prevent ingress into the hinge assembly via the portion of the hinge assembly.

Clause 14: The folding device of clause 13, wherein the cap is formed from the first material.

Clause 15: The folding device of any of clauses 1-14, further including a continuous display that spans the first assembly and the second assembly.

Clause 16: The folding device of any of clauses 1-15, wherein the first material is steel.

Clause 17: The folding device of any of clauses 1-16, wherein the second material is aluminum.

Clause 18: The folding device of any of claims 1-17, further comprising a transceiver configured to transmit and receive wireless signals via an antenna that includes at least a portion of the first main housing component.

Clause 19: The folding device of any of claims 1-18, further comprising a transceiver configured to transmit and receive wireless signals via an antenna that includes at least a portion of the second main housing component.

Clause 20: The folding device of any of claims 1-19, further comprising a transceiver configured to transmit and receive wireless signals via an antenna that includes at least a portion of the first main housing component and at least a portion of the second main housing component.

Various aspects have been described in this disclosure. These and other aspects are within the scope of the following claims.

The invention claimed is:

1. A folding device comprising:
   a hinge assembly defining a first axis and a second axis;
   a first assembly comprising:
      a first arm, rotatably connected to the hinge assembly about the first axis, the first arm formed from a first material;
      a first main housing component formed from a second material that is different than the first material; and
      a first divider disposed between the first arm and the first main housing component; and
   a second assembly comprising:
      a second arm, rotatably connected to the hinge assembly about the second axis, the second arm formed from the first material;
      a second main housing component formed from the second material; and
      a second divider disposed between the second arm and the second main housing component.

2. The folding device of claim 1, wherein the first assembly and the second assembly are configured to rotate about the first axis and the second axis, respectively, to move the folding device into one of an expanded state or a collapsed state.

3. The folding device of claim 2, wherein when the folding device is in the expanded state:
   an inner surface of the first assembly is coplanar with an inner surface of the second assembly; and
   an outer surface of the first assembly is coplanar with an outer surface of the second assembly.

4. The folding device of claim 2, wherein when the folding device is in the collapsed state, an outer surface of the first assembly is parallel with an outer surface of the second assembly.

5. The folding device of claim 1, wherein the first divider and the second divider each comprise a polymer antenna isolator.

6. The folding device of claim 1, wherein the first arm and the second arm are enhanced with a physical vapor deposition.

7. The folding device of claim 1, wherein the first main housing component and the second main housing component are anodized.

8. The folding device of claim 1, wherein:
   an appearance of an outer surface of the first arm is a first color value;
   an appearance of an outer surface of the first main housing component is a second color value;
   an appearance of an outer surface of the first divider is a third color value; and
   the third color value is between the first color value and the second color value.

9. The folding device of claim 1, wherein:
   an appearance of an outer surface of the second arm is a first color value;
   an appearance of an outer surface of the second main housing component is a second color value;
   an appearance of an outer surface of the second divider is a third color value; and
   the third color value is between the first color value and the second color value.

10. The folding device of claim 1, wherein the first main housing component and the second main housing component are configured to send and receive electromagnetic signals.

11. The folding device of claim 1, wherein the hinge assembly further comprises a cap configured to cover a portion of the hinge assembly that is proximate to the first arm and the second arm to prevent ingress into the hinge assembly via the portion of the hinge assembly.

12. The folding device of claim 11, wherein the cap is formed from the first material.

13. The folding device of claim 1, further comprising a continuous display that spans the first assembly and the second assembly.

14. The folding device of claim 1, further comprising a transceiver configured to transmit and receive wireless signals via an antenna that includes at least a portion of the first main housing component.

15. The folding device of claim 1, further comprising a transceiver configured to transmit and receive wireless signals via an antenna that includes at least a portion of the second main housing component.

16. The folding device of claim 1, wherein the first material comprises steel, and wherein the second material comprises aluminum.

17. A folding device comprising:
   a hinge assembly defining a first axis and a second axis;
   a first assembly comprising:
      a first arm, rotatably connected to the hinge assembly about the first axis, the first arm formed from a first material;
      a first main housing component formed from a second material that is different than the first material; and
      a first divider disposed between the first arm and the first main housing component;
   a second assembly comprising:
      a second arm, rotatably connected to the hinge assembly about the second axis, the second arm formed from the first material;
      a second main housing component formed from the second material;
      a second divider disposed between the second arm and the second main housing component; and
      a transceiver configured to transmit and receive wireless signals via an antenna that includes at least a portion of the second main housing component; and
   a continuous display that spans the first assembly and the second assembly, wherein:
      an appearance of an outer surface of the second arm is a first color value;
      an appearance of an outer surface of the second main housing component is a second color value;
      an appearance of an outer surface of the second divider is a third color value;
      the third color value is between the first color value and the second color value;
      the first material comprises steel; and
      the second material comprises aluminum.

* * * * *